United States Patent
Wang et al.

(10) Patent No.: US 8,331,482 B2
(45) Date of Patent: Dec. 11, 2012

(54) SYSTEM AND METHOD FOR SUBCARRIER ALLOCATION AND PERMUTATION

(75) Inventors: Lai-Huei Wang, Bade (TW); Chia-Lung Tsai, Hsinchu (TW); Yu-Tao Hsieh, Hsinchu (TW); Pang-An Ting, Fongyuan (TW); Jen-Yuan Hsu, Jincheng Township (TW)

(73) Assignee: Industrial Technology Research Institute, Hsinchu (TW)

( * ) Notice: Subject to any disclaimer, the term of this patent is extended or adjusted under 35 U.S.C. 154(b) by 823 days.

(21) Appl. No.: 12/481,880

(22) Filed: Jun. 10, 2009

(65) Prior Publication Data

US 2010/0158143 A1    Jun. 24, 2010

Related U.S. Application Data

(60) Provisional application No. 61/139,822, filed on Dec. 22, 2008, provisional application No. 61/142,433, filed on Jan. 5, 2009.

(51) Int. Cl.
*H04L 27/26* (2006.01)
*H04L 23/00* (2006.01)

(52) U.S. Cl. ........................ 375/295; 375/377

(58) Field of Classification Search .................. 375/159, 375/260, 295, 377; 370/206, 208, 210, 431, 370/437; 455/450, 451, 452
See application file for complete search history.

(56) References Cited

U.S. PATENT DOCUMENTS

| | | | |
|---|---|---|---|
| 5,737,252 A | | 4/1998 | Hollmann et al. |
| 7,372,909 B2 * | | 5/2008 | Miyoshi ........................ 375/260 |
| 7,646,747 B2 * | | 1/2010 | Atarashi et al. ............... 370/329 |
| 2007/0140103 A1 * | | 6/2007 | Ouyang et al. ................. 370/208 |
| 2008/0057869 A1 * | | 3/2008 | Strong et al. ................. 455/63.1 |
| 2008/0079574 A1 | | 4/2008 | Soffer |
| 2008/0080641 A1 | | 4/2008 | Kim |
| 2008/0115032 A1 | | 5/2008 | Henige et al. |
| 2008/0187064 A1 * | | 8/2008 | Miyoshi ........................ 375/260 |
| 2008/0240281 A1 | | 10/2008 | Gaal et al. |
| 2009/0060072 A1 * | | 3/2009 | Hamamoto .................... 375/260 |
| 2010/0104044 A1 * | | 4/2010 | Kishigami et al. ............ 375/299 |

FOREIGN PATENT DOCUMENTS

WO    WO 2006/102771    10/2006

OTHER PUBLICATIONS

FWU, Jong-Kae (JK), et al., Proposed Text of DL Physical Layer Section for the IEEE 802.16m Amendment. Intel Corporation, IEEE C802.16m-08/1443r2, Nov. 3, 2008.
OFDM and Multi-Channel Communication Systems, NI Developer Zone, National Instruments , Jan. 2, 2007.

* cited by examiner

*Primary Examiner* — Tesfaldet Bocure
(74) *Attorney, Agent, or Firm* — Finnegan, Henderson, Farabow, Garrett & Dunner, LLP (57) ABSTRACT

A subcarrier allocation method for use by a transmitter, the transmitter being configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream. The method includes allocating, when the transmitter transmits the first data stream but does not transmit the second data stream, the second plurality of subcarriers to carry no formation or information relating to the first data stream.

20 Claims, 12 Drawing Sheets

SYSTEM AND METHOD FOR SUBCARRIER ALLOCATION AND PERMUTATION

RELATED APPLICATIONS

This application is based upon and claims the benefit of priority from U.S. Provisional Patent Application No. 61/139,822, filed Dec. 22, 2008, and U.S. Provisional Patent Application No. 61/142,433, filed Jan. 5, 2009, the entire contents of which are incorporated herein by reference.

FIELD OF THE DISCLOSURE

This disclosure relates to systems and methods for subcarrier allocation and permutation in wireless communication.

BACKGROUND

Wireless communication techniques based on multiple subcarriers, such as an orthogonal frequency-division multiplexing (OFDM) technique, are gaining worldwide popularity due to their broad applications. For example, an OFDM based communication system may be used in a plurality of networks including Worldwide Interoperability for Microwave Access (WiMax) networks, Wireless Fidelity (Wi-Fi) networks, Wireless Broadband (WiBro) networks, etc.

A transmitter in an OFDM based communication system may use a plurality of closely-spaced orthogonal subcarriers to carry data. For example, the transmitter may allocate the data on a plurality of parallel data channels, one for each of the subcarriers. Each of the subcarriers may be modulated with a conventional modulation scheme, e.g., quadrature amplitude modulation, at a relatively low symbol rate. In addition, the transmitter may perform an inverse fast Fourier transform (IFFT) on OFDM symbols representing the data to be transmitted, and transmit signals including the OFDM symbols to a receiver in the communication system. The receiver may perform a fast Fourier transform (FFT) on received signals to recover the OFDM symbols and, hence, the data.

The signals are transmitted from the transmitter to the receiver through a communication channel. In reality, the communication channel may have an effect on the signals when the signals are transmitted. The receiver may need knowledge of the communication channel to remove such effect, in order to accurately recover the data. To facilitate estimation of the communication channel, signals known to both the transmitter and the receiver, i.e., pilot symbols, may be inserted in OFDM symbols at the transmitter, such that the OFDM symbols include both data symbols and pilot symbols. The receiver may perform channel estimation based on resource units, also known as resource blocks, in the received signals, and each of the resource units includes a plurality of OFDM symbols and pilot symbols.

Typically, the transmitter is configured to transmit multiple data streams, such as first and second data streams. Accordingly, the transmitter is configured to allocate to ones of the subcarriers the respective pilot symbols for the first and second data streams, when the transmitter transmits the first and second data streams. However, in reality, the transmitter may transmit a reduced number of data streams, such as only the first data stream. In such a situation, the subcarriers that would otherwise carry the pilot symbols for the second data stream may become null subcarriers, i.e., carry no pilot or data symbol.

In addition, to increase a diversity of a channel coding block, e.g., a forward error correction (FEC) block, in the communication system, subcarrier permutation may be performed on data symbols. For example, the subcarrier permutation may be performed by changing locations of data symbols in, e.g., each resource unit.

SUMMARY

According to a first aspect of the present disclosure, there is provided a subcarrier allocation method for use by a transmitter, the transmitter being configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream, the method comprising: allocating, when the transmitter transmits the first data stream but does not transmit the second data stream, the second plurality of subcarriers to carry no formation or information relating to the first data stream.

According to a second aspect of the present disclosure, there is provided a subcarrier permutation method for use by a transmitter, the transmitter being configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream, and allocate data symbols for the first and second data streams to a third plurality of subcarriers, the method comprising: allocating, when the transmitter transmits the first data stream but does not transmit the second data stream, the second plurality of subcarriers to carry a plurality of data symbols for the first data stream; allocating, when the transmitter transmits the first data stream but does not transmit the second data stream, the third plurality of subcarriers to carry a plurality of pairs of data symbols for the first data stream; and performing permutation on the plurality of pairs of data symbols carried by the third plurality of subcarriers.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the disclosure and, together with the description, serve to explain the principles of the disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations consistent with the disclosure. Instead, they are merely examples of systems and methods consistent with aspects related to the disclosure as recited in the appended claims.

Figure 1:
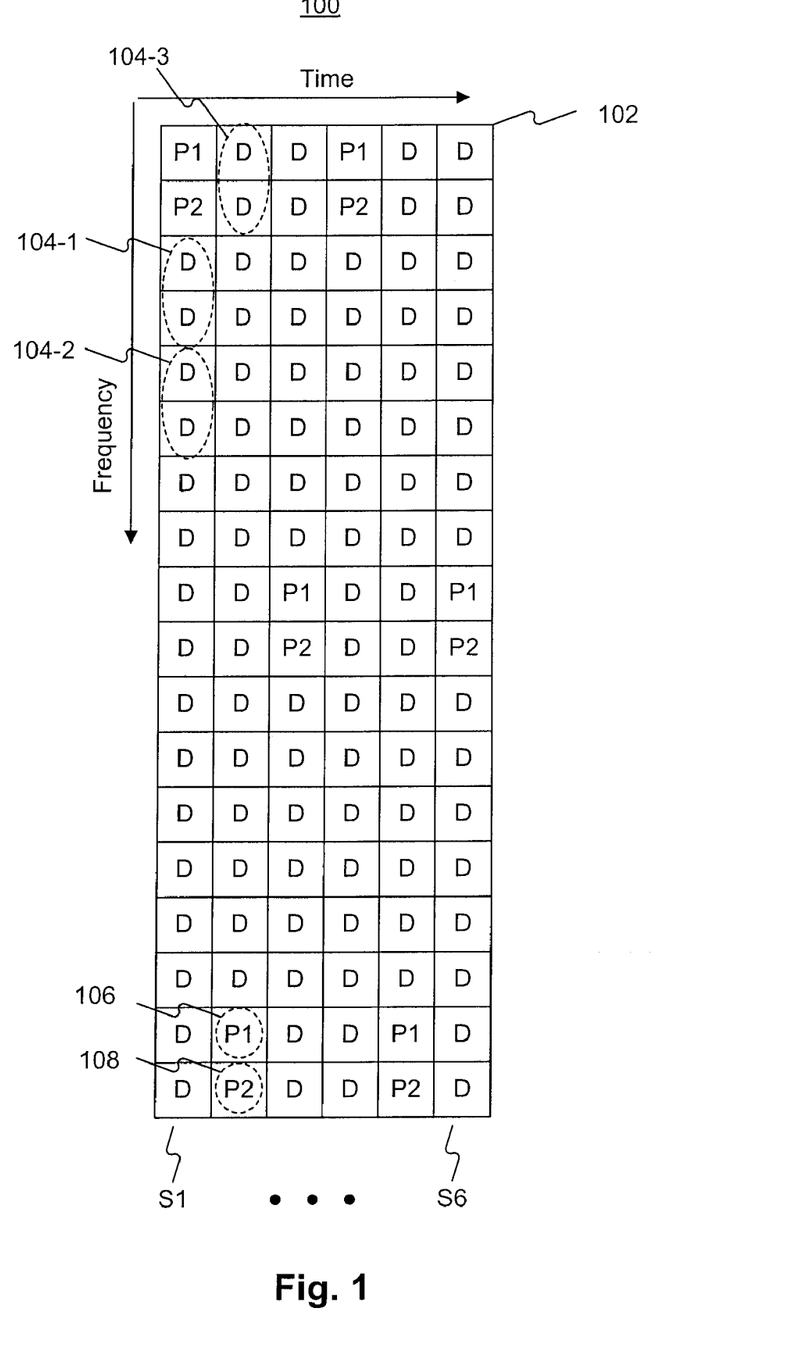
FIG. 1 illustrates a subcarrier allocation method, according to an exemplary embodiment.

FIG. 1 illustrates a subcarrier allocation method 100 for use by a transmitter, according to an exemplary embodiment. For illustrative purposes only, it is assumed that the transmitter is in an orthogonal frequency-division multiplexing (OFDM) based communication system, and is configured to transmit, e.g., first and second data streams. For example, the communication system may be a multiple-input and multiple-output (MIMO) system based on a space-time block coding (STBC) scheme or a space-frequency block coding (SFBC) scheme.

Referring to FIG. 1, a resource unit (RU) or resource block 102 in a time-frequency domain is used to illustrate the subcarrier allocation method 100. For example, an RU is a representation of pilot and data symbols included in a plurality of contiguous OFDM symbols shown in the time-frequency domain. Each row of the RU 102 corresponds to a subcarrier frequency of the transmitter, and each column of the RU 102 corresponds to an OFDM symbol or a time index. As a result, each small block in the RU 102 corresponds to a subcarrier, which further corresponds to a combination of a subcarrier frequency and a time index. In the illustrated embodiment, the RU 102 includes an even number of subcarrier frequencies, e.g., eighteen subcarrier frequencies, to support the STBC scheme or the SFBC scheme.

For example, the RU 102 may correspond to OFDM symbols S1, . . . , S6, which further include a plurality of data symbols, each represented by a letter "D," and a plurality of pilot symbols, each represented by an indexed letter P. In the illustrated embodiment, the indexed letters "P1" and "P2" represent pilot symbols for the first and second data streams, respectively. In the RU 102, each of the OFDM symbols S1, . . . , S6 corresponds to one of the columns of data symbols "D" and any pilot symbols included therein.

In exemplary embodiments, when the transmitter transmits the first and second data streams, pilot symbols for the first and second data streams, such as pilot symbols 106 and 108 may, optionally, be allocated to adjacent subcarriers. For example, a first plurality of subcarriers, which correspond to the small blocks labeled with "P1" in FIG. 1, carry the pilot symbols for the first data stream, and a second plurality of subcarriers, which correspond to the small blocks labeled with "P2" in FIG. 1, carry the pilot symbols for the second data stream.

In exemplary embodiments, when the transmitter transmits the first and second data streams, data symbols for the first and second data streams may be allocated to a third plurality of subcarriers, to form a plurality of pairs of data symbols. Each of the plurality of pairs may be allocated to adjacent subcarriers in an OFDM symbol, such as data symbol pairs 104-1, 104-2, and 104-3. Allocation of data symbols in this manner may facilitate implementation of the SFBC scheme. Alternatively, each of the plurality of pairs may be allocated to subcarriers at adjacent times (not shown). Allocation of data symbols in this manner may facilitate implementation of the STBC scheme.

In exemplary embodiments, when the transmitter transmits a reduced number of data streams, e.g., only the first data stream, data symbols for the first data stream may be allocated to the third plurality of subcarriers to form a plurality of pairs of data symbols, similar to the data symbol pairs 104-1, 104-2, and 104-3, and each of the plurality of pairs are allocated to adjacent subcarriers in an OFDM symbol. As noted above, allocation of data symbols in this manner may facilitate implementation of the SFBC scheme.

In addition, when the transmitter transmits a reduced number of data streams, e.g., only the first data stream, the subcarriers that would otherwise carry the pilot symbols for the second data stream, i.e., the second plurality of subcarriers, may or may not be used to carry information relating to the first data stream. In one exemplary embodiment, the second plurality of subcarriers may carry no information. In other words, the second plurality of subcarriers may become null subcarriers.

Figure 2:
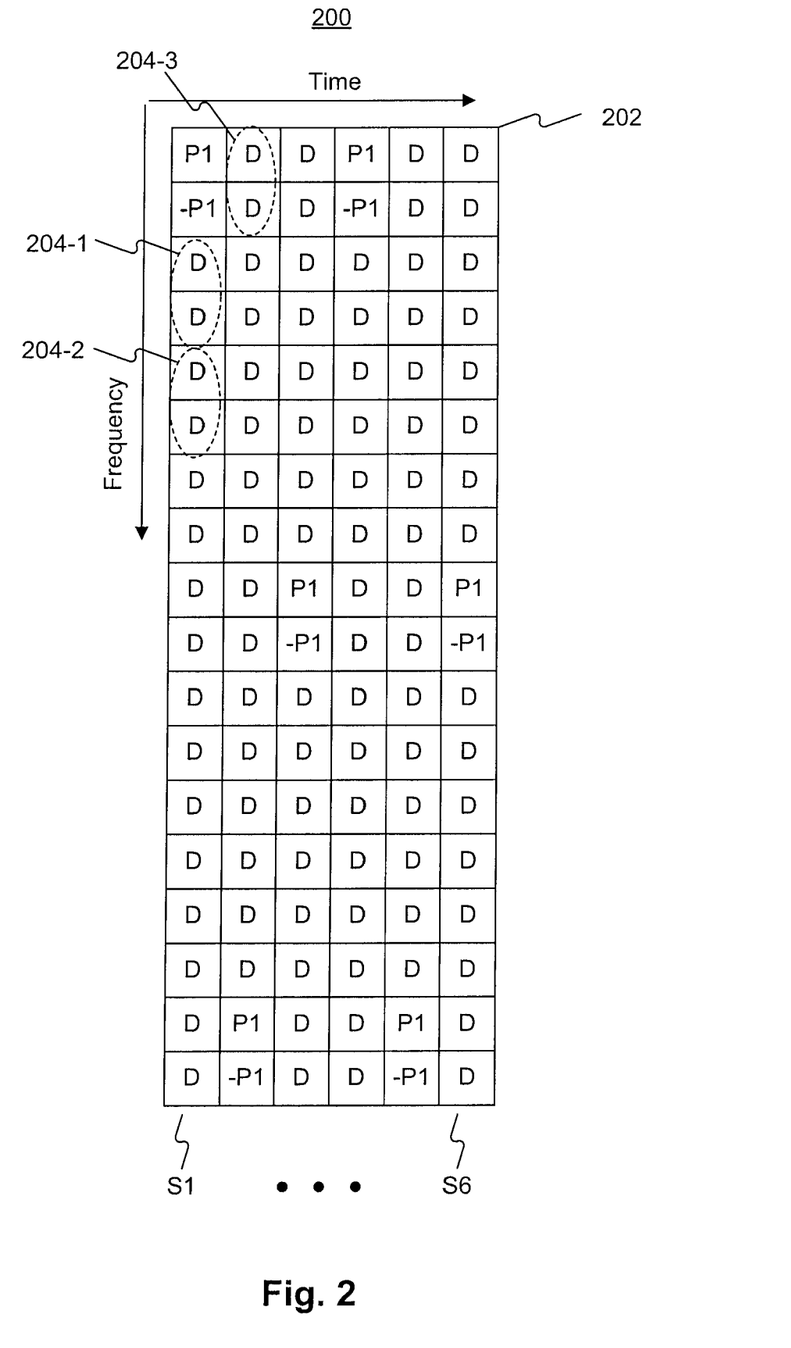
FIG. 2 illustrates a subcarrier allocation method for use when a transmitter transmits a reduced number of data streams, according to an exemplary embodiment.

In one exemplary embodiment, the second plurality of subcarriers may be used to carry control information, such as pilot symbols, for the first data stream. FIG. 2 illustrates a subcarrier allocation method 200 for use when the transmitter transmits a reduced number of data streams, e.g., only the first data stream, according to an exemplary embodiment. Referring to FIG. 2, an RU 202 in a time-frequency domain is used to illustrate the subcarrier allocation method 200. For example, the RU 202 may correspond to the RU 102 (FIG. 1). As a result, similar to the RU 102, the RU 202 may also include a plurality of pairs of data symbols, such as data symbol pairs 204-1, 204-2, and 204-3.

In addition, the first plurality of subcarriers, which correspond to the small blocks labeled with "P1" in FIG. 2, may be used to carry pilot symbols for the first data stream. The second plurality of subcarriers, which correspond to the small blocks labeled with "−P1" in FIG. 2, may also be used to carry pilot symbols for the first data stream, to form a plurality of pairs of anti-polar pilot symbols, i.e., a pair of pilot symbols "P1" and "−P1." Modulation of pilot symbols having anti-polarity may reduce inter-carrier interference (ICI). Accordingly, accuracy of channel estimation based on interpolation techniques may be improved.

Figure 3:
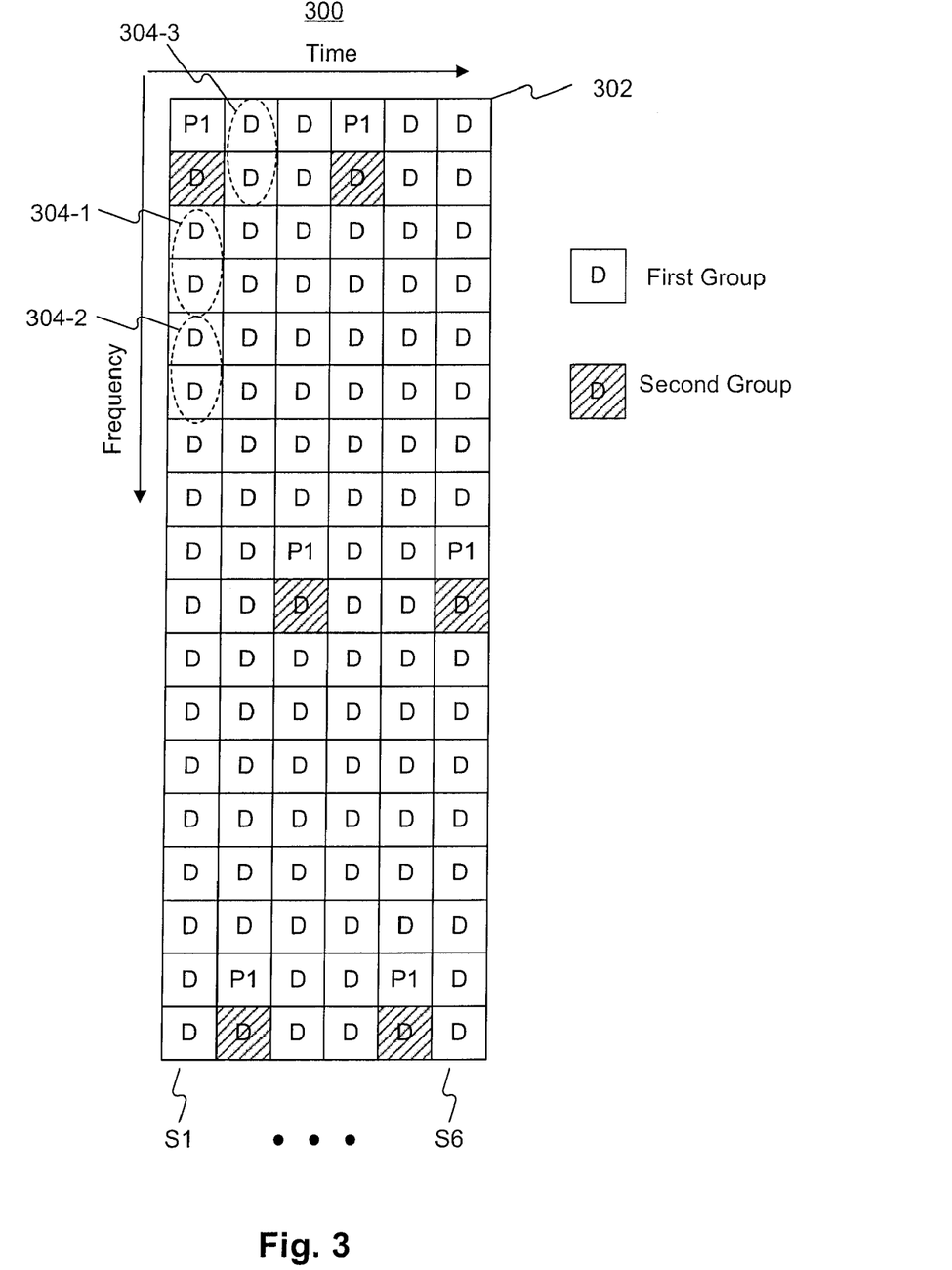
FIG. 3 illustrates a subcarrier allocation method for use when a transmitter transmits a reduced number of data streams, according to an exemplary embodiment.

Alternatively, the second plurality of subcarriers may be used to carry data information for the first data stream. When the second plurality of subcarriers are used to carry data information for the first data stream, system throughput may be enhanced. FIG. 3 illustrates a subcarrier allocation method 300 for use when the transmitter transmits a reduced number of data streams, e.g., only the first data stream, according to an exemplary embodiment. Referring to FIG. 3, an RU 302 in a time-frequency domain is used to illustrate the subcarrier allocation method 300. For example, the RU 302 may correspond to the RU 102 (FIG. 1). As a result, similar to the RU 102, the RU 302 may also include a plurality of pairs of data symbols, represented by the letter "D" in the un-shaded, small blocks, such as data symbol pairs 304-1, 304-2, and 304-3.

In addition, the first plurality of subcarriers, which correspond to the small blocks labeled with "P1" in FIG. 3, may be used to carry pilot symbols for the first data stream. The second plurality of subcarriers, which correspond to the shaded, small blocks labeled with "D" in FIG. 3, may be used to carry data symbols for the first data stream.

Figure 4A:
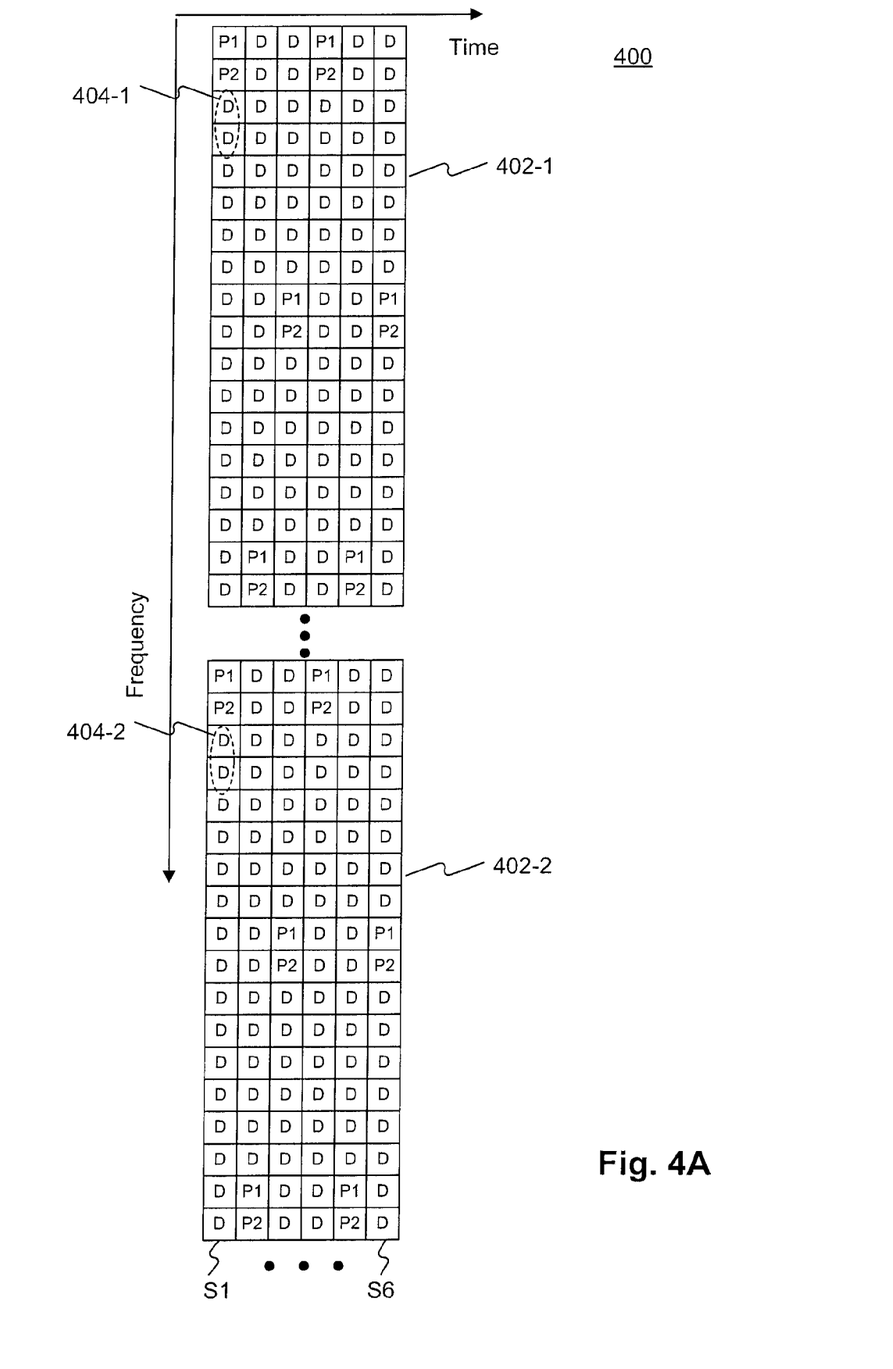
FIGS. 4A and 4B illustrate a subcarrier allocation method, according to an exemplary embodiment.
Figure 4B:
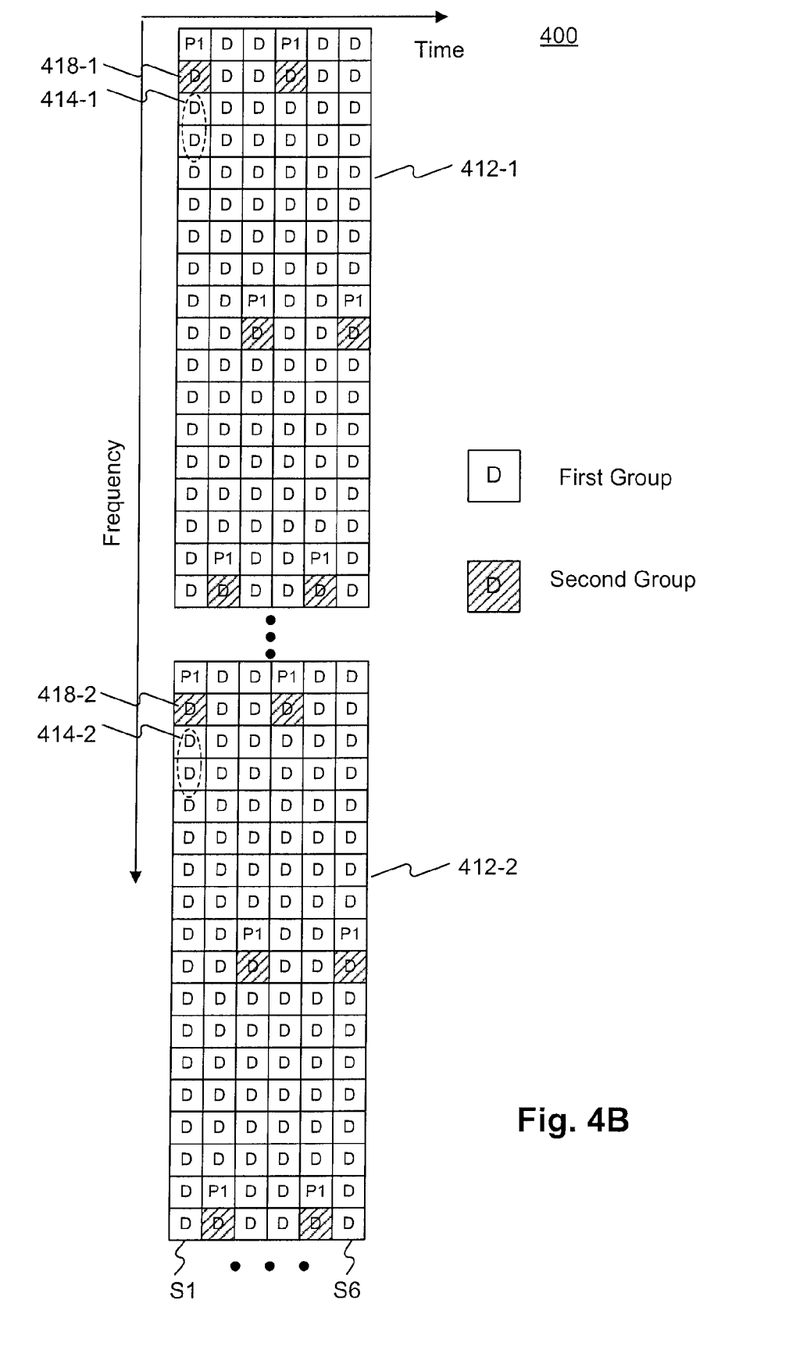

FIGS. 4A and 4B illustrate a subcarrier allocation method 400 for use by the above-described transmitter, according to an exemplary embodiment. Referring to FIG. 4A, when the transmitter transmits the first and second data streams, the transmitter may generate a first plurality of RUs in a time-frequency domain. For illustrative purposes only, first and second RUs 402-1 and 402-2 are shown in FIG. 4A. Each row of the RU 402-1 or 402-2 corresponds to a subcarrier frequency of the transmitter, and each column of the RU 402-1 or 402-2 corresponds to an OFDM symbol or a time index. Each small block in the RU 402-1 or 402-2 corresponds to a subcarrier, which further corresponds to a combination of a subcarrier frequency and a time index. In the illustrated embodiment, each of the RUs 402-1 and 402-2 includes an even number of subcarrier frequencies, e.g., eighteen subcarrier frequencies, to support the STBC scheme or the SFBC scheme.

The RUs 402-1 and 402-2 may correspond to a plurality of OFDM symbols such as OFDM symbols S1, . . . , S6. In the illustrated embodiment, the RUs 402-1 and 402-2 correspond to a same time period, and the corresponding columns of the RUs 402-1 and 402-2 therefore correspond to a same OFDM symbol. For example, the first column of the RU 402-1 and the first column of the RU 402-2 correspond to the OFDM symbol S1.

The RUs 402-1 and 402-2 may each include a plurality of data symbols, each represented by a letter "D," and a plurality of pilot symbols, each represented by an indexed letter P. For example, the indexed letters "P1" and "P2" represent pilot symbols for the first and second data streams, respectively.

In exemplary embodiments, when the transmitter transmits the first and second data streams, pilot symbols for the first and second data streams may be allocated to adjacent subcarriers, as shown in FIG. 4A. As a result, for each of the RUs 402-1 and 402-2, a first plurality of subcarriers, which correspond to the small blocks labeled with "P1" in FIG. 4A, carry the pilot symbols for the first data stream, and a second plurality of subcarriers, which correspond to the small blocks labeled with "P2" in FIG. 4A, carry the pilot symbols for the second data stream.

In addition, when the transmitter transmits the first and second data streams, data symbols for the first and second data streams may be allocated to a third plurality of subcarriers, which correspond to the small blocks labeled with "D" in FIG. 4A, to form a plurality of pairs of data symbols in each of the RUs 402-1 and 402-2. Each of the plurality of pairs may be allocated to adjacent subcarriers in an OFDM symbol, such as data symbol pairs 404-1 and 404-2. Allocation of data symbols in this manner may facilitate implementation of the SFBC scheme. Alternatively, each of the plurality of pairs may be allocated to subcarriers at adjacent times (not shown). Allocation of data symbols in this manner may facilitate implementation of the STBC scheme.

Referring to FIG. 4B, when the transmitter transmits a reduced number of data streams, e.g., only the first data stream, the transmitter may generate a second plurality of RUs in a time-frequency domain. For illustrative purposes only, first and second RUs 412-1 and 412-2 are shown in FIG. 4B. The RUs 412-1 and 412-2 may correspond to the RUs 402-1 and 402-2 (FIG. 4A), respectively. As a result, similar to the RUs 402-1 and 402-2, the RUs 412-1 and 412-2 may each include a plurality of pairs of data symbols, such as data symbol pairs 414-1 and 414-2, and each of the plurality of pairs are allocated to adjacent subcarriers in an OFDM symbol. As noted above, allocation of data symbols in this manner may facilitate implementation of the SFBC scheme. The plurality of pairs of data symbols are allocated to the third plurality of subcarriers, which correspond to the un-shaded, small blocks labeled with the letter "D," in each of the RUs 412-1 and 412-2. The plurality of pairs of data symbols are classified as a first group of data symbols.

In addition, for each of the RUs 412-1 and 412-2, the first plurality of subcarriers, which correspond to the small blocks labeled with "P1" in FIG. 4B, may be used to carry pilot symbols for the first data stream. Also, for each of the RUs 412-1 and 412-2, the second plurality of subcarriers, which correspond to the shaded, small blocks labeled as "D," may be used to carry data symbols, such as data symbols 418-1 and 418-2, for the first data stream. The data symbols carried by the second plurality of subcarriers are classified as a second group of data symbols. Therefore, in each of the RUs 412-1 and 412-2, there are a plurality of single data symbols for the first data stream, i.e., the second group of data symbols, in addition to the plurality of pairs of data symbols, i.e., the first group of data symbols.

In exemplary embodiments, the transmitter may further perform permutation on the data symbols for the first data stream based on classification in the first group or the second group. Generally, when the transmitter performs permutation on a plurality of data symbols, ones of the plurality of data symbols originally allocated to a first plurality of subcarriers may be re-allocated to a second plurality of subcarriers. As a result, positions of the ones of the plurality of data symbols in one or more RUs may be changed after the permutation. It is to be understood that, when the transmitter performs permutation on the plurality of data symbols, one or more of the plurality of data symbols may still be allocated to their original subcarriers after the permutation.

In exemplary embodiments, the transmitter may perform permutation on the data symbols in the first group and the data symbols in the second group separately. Accordingly, positions of the data symbols may be exchanged within each group, but may not be exchanged between the first and second groups. For example, for the data symbols in the first group, the permutation may be performed on a data symbol pair basis. As a result, positions of first and second data symbol pairs in the first group may be exchanged after the permutation. Also for example, for the data symbols in the second group, the permutation may be performed on a single data symbol basis. As a result, positions of first and second data symbols in the second group may be exchanged after the permutation. In addition, the permutation may be performed within each RU or among different RUs. The permutation may also be performed within each OFDM symbol or among different OFDM symbols.

In exemplary embodiments, positions of the data symbols in the second group after the permutation may be determined based on different factors. For example, the permutation of the data symbols in the second group, which is performed on a single data symbol basis, may not affect the permutation of the data symbols in the first group, which is performed on a data symbol pair basis. Also for example, the permutation of the data symbols in the second group may be performed such that, after the permutation, the data symbols in the second group are still allocated to the second plurality of subcarriers. In other words, the data symbols in the second group occupy a same plurality of positions after the permutation.

Figure 5:
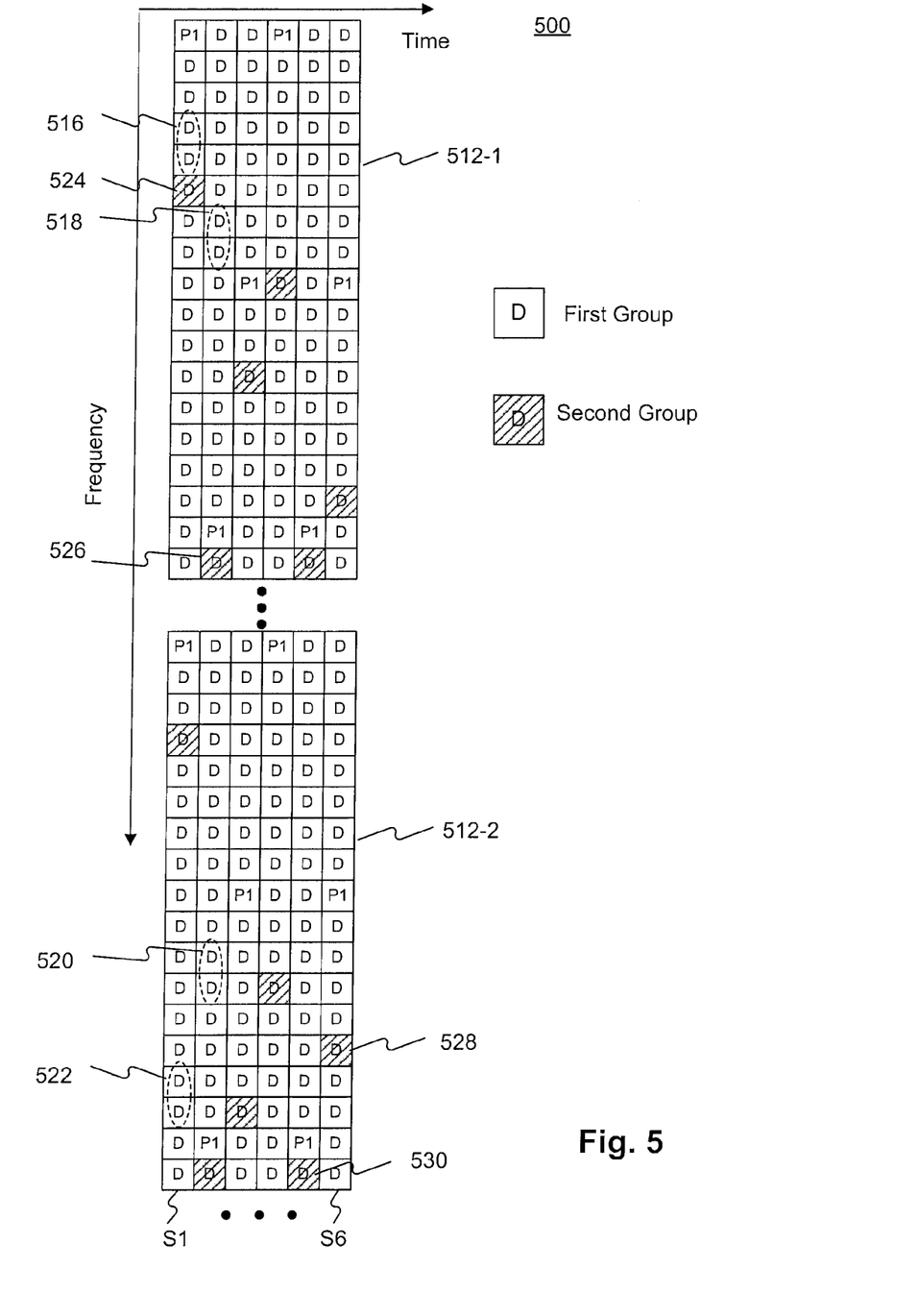
FIG. 5 illustrates a subcarrier permutation method, according to an exemplary embodiment.

FIG. 5 illustrates a permutation method 500 performed on the RUs 412-1 and 412-2 (FIG. 4B), according to an exemplary embodiment. Referring to FIGS. 4B and 5, the RUs 412-1 and 412-2 become RUs 512-1 and 512-2, respectively, after permutation.

In exemplary embodiments, positions of the pilot symbols for the first data stream may not be changed. Permutation of the data symbols in the first group may be performed on a data symbol pair basis. The permutation of the data symbols in the first group may be performed within each RU or among different RUs. The permutation of the data symbols in the first group may also be performed within each OFDM symbol or among different OFDM symbols. For example, after the permutation, the data symbol pair 414-1 in the RU 412-1 (FIG. 4B) may correspond to data symbol pair 516 or 518 in the RU 512-1, or correspond to data symbol pair 520 or 522 in the RU 512-2.

In exemplary embodiments, permutation of the data symbols in the second group may be performed on a single data symbol basis. The permutation of the data symbols in the second group may be performed within each RU or among different RUs. The permutation of the data symbols in the second group may be performed within each OFDM symbol or among different OFDM symbols. For example, after the permutation, the data symbol 418-1 in the RU 412-1 (FIG. 4B) may correspond to data symbol 524 or 526 in the RU 512-1, or correspond to data symbol 528 or 530 in the RU 512-2.

In exemplary embodiments, the permutation of the data symbols in the second group may not be performed. In such embodiments, only the permutation of the data symbols in the first group is performed on a data symbol pair basis.

Figure 6:
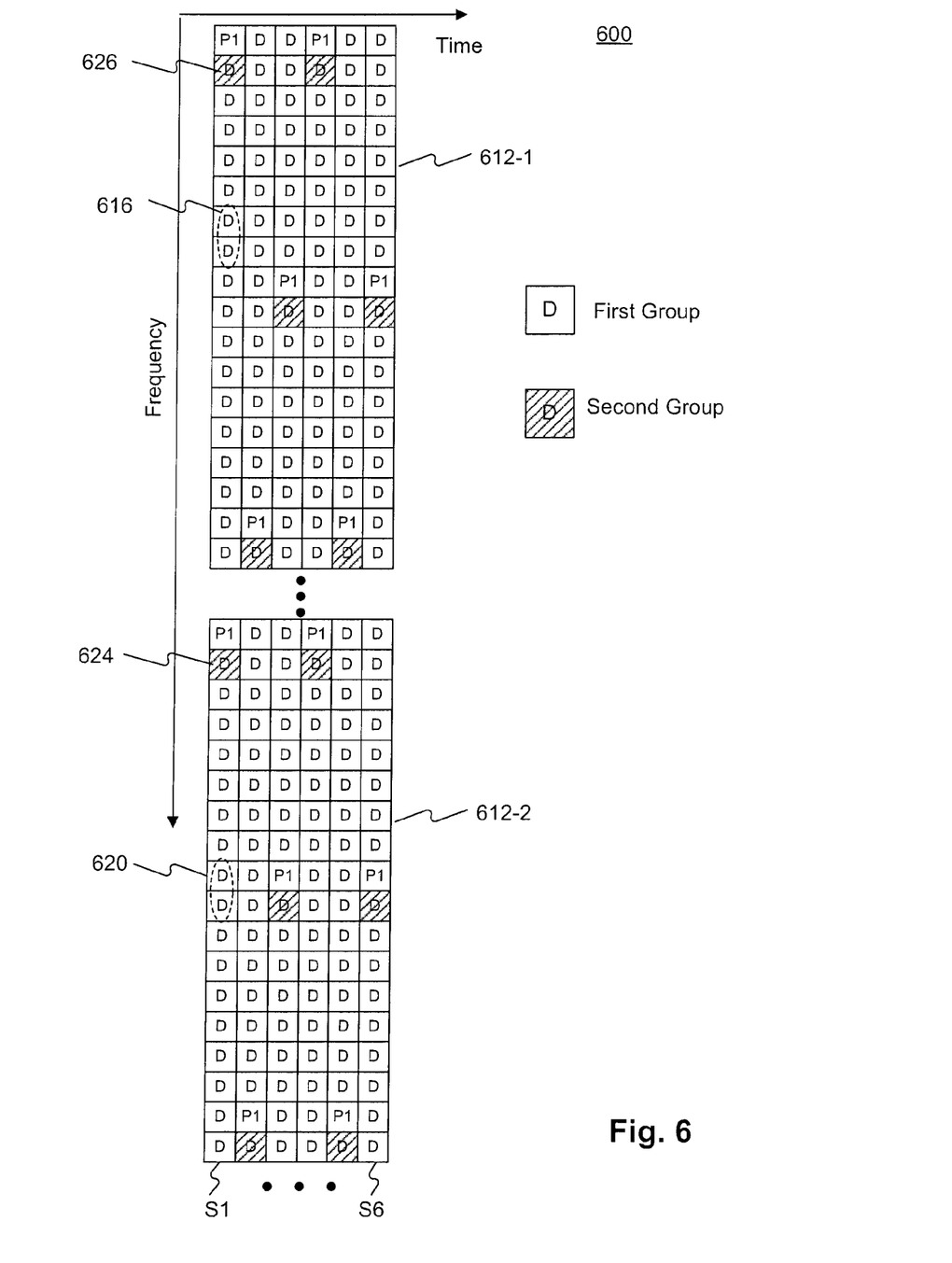
FIG. 6 illustrates a subcarrier permutation method, according to an exemplary embodiment.

FIG. 6 illustrates a permutation method 600 performed on the RUs 412-1 and 412-2 (FIG. 4B), according to an exemplary embodiment. Referring to FIGS. 4B and 6, the RUs 412-1 and 412-2 become RUs 612-1 and 612-2, respectively, after permutation. In the illustrated embodiment, permutation of the data symbols in the second group is performed such that, after the permutation, the data symbols in the second group are still allocated to the second plurality of subcarriers. In other words, the data symbols in the second group occupy a same plurality of positions after the permutation, although those data symbols may be exchanged within the plurality of positions.

For example, permutation of the data symbols in the second group may be performed based on a single data symbol basis. The permutation of the data symbols in the second group may be performed within each RU or among different RUs, but within each OFDM symbol. Also for example, after the permutation, the data symbol 418-1 in the RU 412-1 (FIG. 4B) may correspond to data symbol 624 in the RU 612-2, and the data symbol 418-2 in the RU 412-2 (FIG. 4B) may correspond to data symbol 626 in the RU 612-1.

In addition, positions of the pilot symbols for the first data stream may not be changed. Permutation of the data symbols in the first group may be performed on a data symbol pair basis. The permutation of the data symbols in the first group may be performed within each RU or among different RUs, but within each OFDM symbol. For example, after the permutation, the data symbol pair 414-1 in the RU 412-1 (FIG. 4B) may correspond to data symbol pair 616 in the RU 612-1, or correspond to data symbol pair 620 in the RU 612-2.

Figure 7:
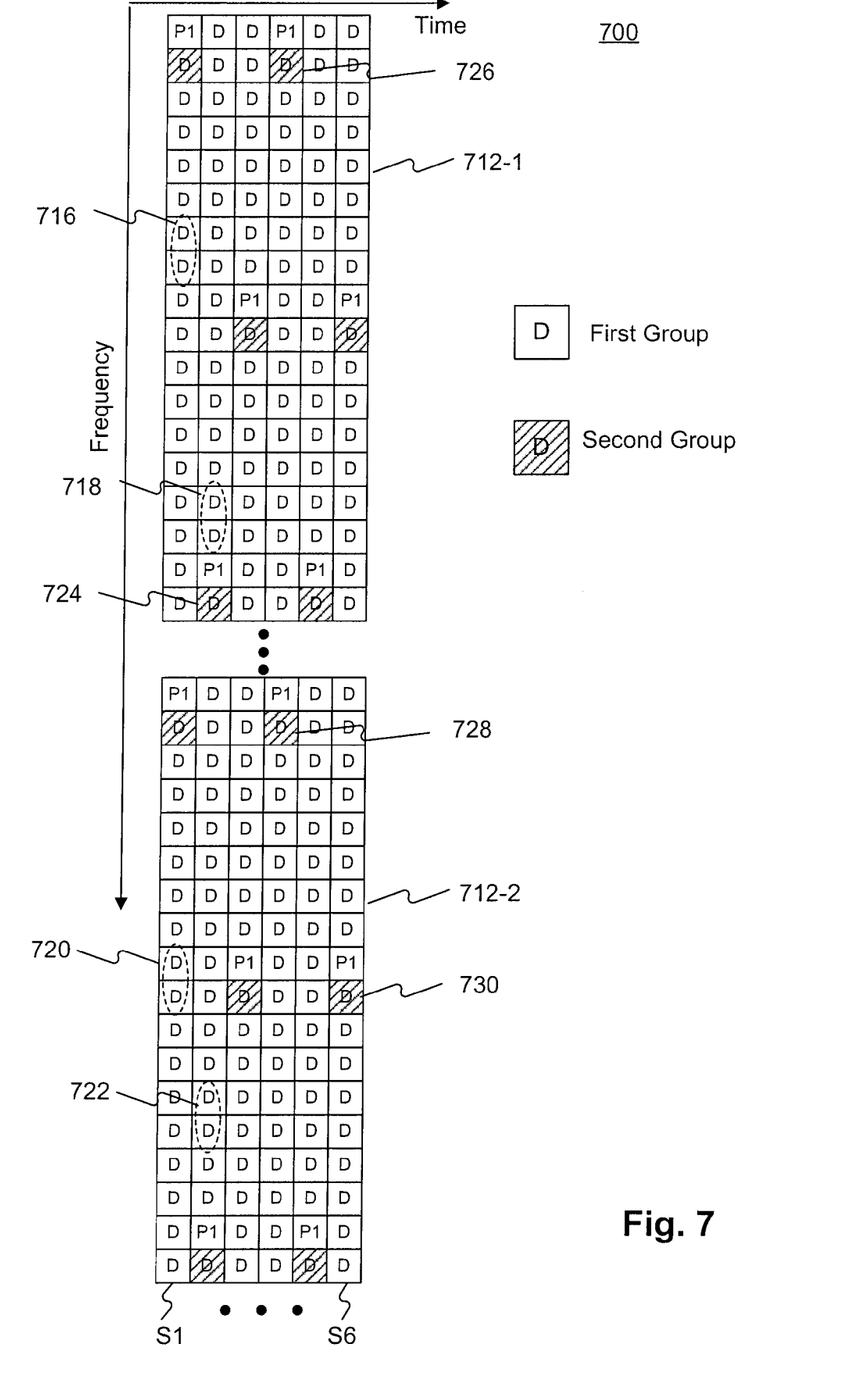
FIG. 7 illustrates a subcarrier permutation method, according to an exemplary embodiment.

FIG. 7 illustrates a permutation method 700 performed on the RUs 412-1 and 412-2 (FIG. 4B), according to an exemplary embodiment. Referring to FIGS. 4B and 7, the RUs 412-1 and 412-2 become RUs 712-1 and 712-2, respectively, after permutation. In the illustrated embodiment, permutation of the data symbols in the second group is performed such that, after the permutation, the data symbols in the second group are still allocated to the second plurality of subcarriers. In other words, the data symbols in the second group occupy a same plurality of positions after the permutation, although those data symbols may be exchanged within the plurality of positions.

For example, permutation of the data symbols in the second group may be performed based on a single data symbol basis. The permutation of the data symbols in the second group may be performed within each OFDM symbol or among different OFDM symbols, but within each RU. Also for example, after the permutation, the data symbol 418-1 in the RU 412-1 (FIG. 4B) may correspond to data symbol 724 or 726 in the RU 712-1, and the data symbol 418-2 in the RU 412-2 (FIG. 4B) may correspond to data symbol 728 or 730 in the RU 712-2.

In addition, positions of the pilot symbols for the first data stream may not be changed. Permutation of the data symbols in the first group may be performed on a data symbol pair basis. The permutation of the data symbols in the first group may be performed within each OFDM symbol or among different OFDM symbols, but within each RU. For example, after the permutation, the data symbol pair 414-1 in the RU 412-1 (FIG. 4B) may correspond to data symbol pair 716 or 718 in the RU 712-1, and the data symbol pair 414-2 in the RU 412-2 (FIG. 4B) may correspond to data symbol pair 720 or 722 in the RU 712-2.

Figure 8:
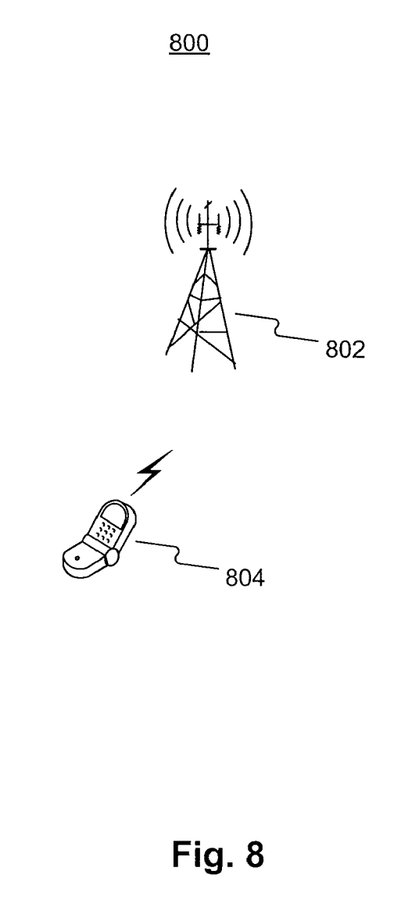
FIG. 8 illustrates a block diagram of a communication system, according to an exemplary embodiment.

FIG. 8 illustrates a block diagram of a communication system 800 that may use any of the above-described subcarrier allocation and/or permutation methods 100-700, according to an exemplary embodiment. The communication system 800 includes at least a transmitter 802 and a receiver 804. For example, the transmitter 802 may be a base station, and the receiver 804 may be a mobile station. The transmitter 802 is configured to insert pilot symbols into signals to be transmitted and to perform subcarrier allocation and/or permutation based on any of the above-described subcarrier allocation and/or permutation methods 100-700. The receiver 804 is configured to receive signals from the transmitter 802 and to perform channel estimation based on the pilot symbols.

Figure 9:
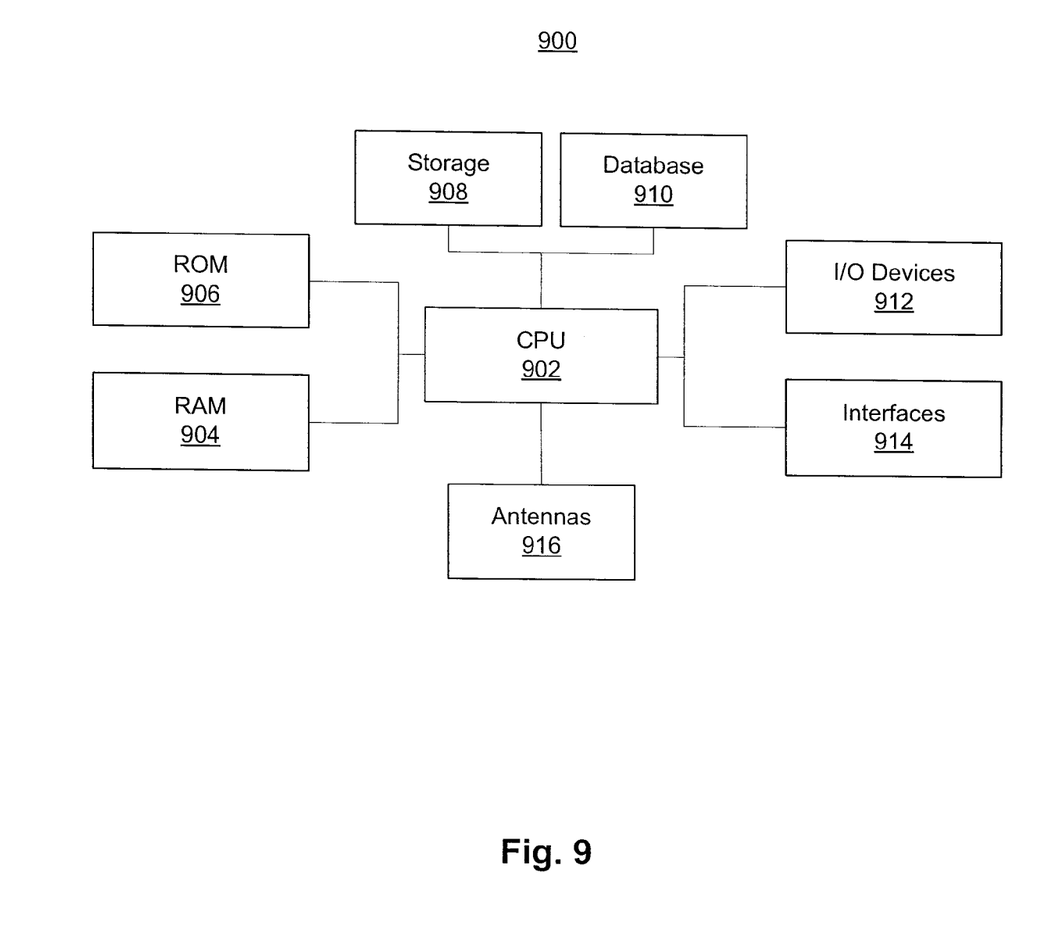
FIG. 9 illustrates a flow chart of a subcarrier allocation method for use by a transmitter, according to an exemplary embodiment.

FIG. 9 illustrates a block diagram of an exemplary transmitter 900, according to an exemplary embodiment. For example, the transmitter 900 may be the transmitter 802 (FIG. 8). Referring to FIG. 9, the transmitter 900 may include one or more of the following components: at least one central processing unit (CPU) 902 configured to execute computer program instructions to perform various processes and methods, random access memory (RAM) 904 and read only memory (ROM) 906 configured to access and store information and computer program instructions, storage 908 to store data and information, databases 910 to store tables, lists, or other data structures, I/O devices 912, interfaces 914, antennas 916, etc. Each of these components is well-known in the art and will not be discussed further.

Figure 10:
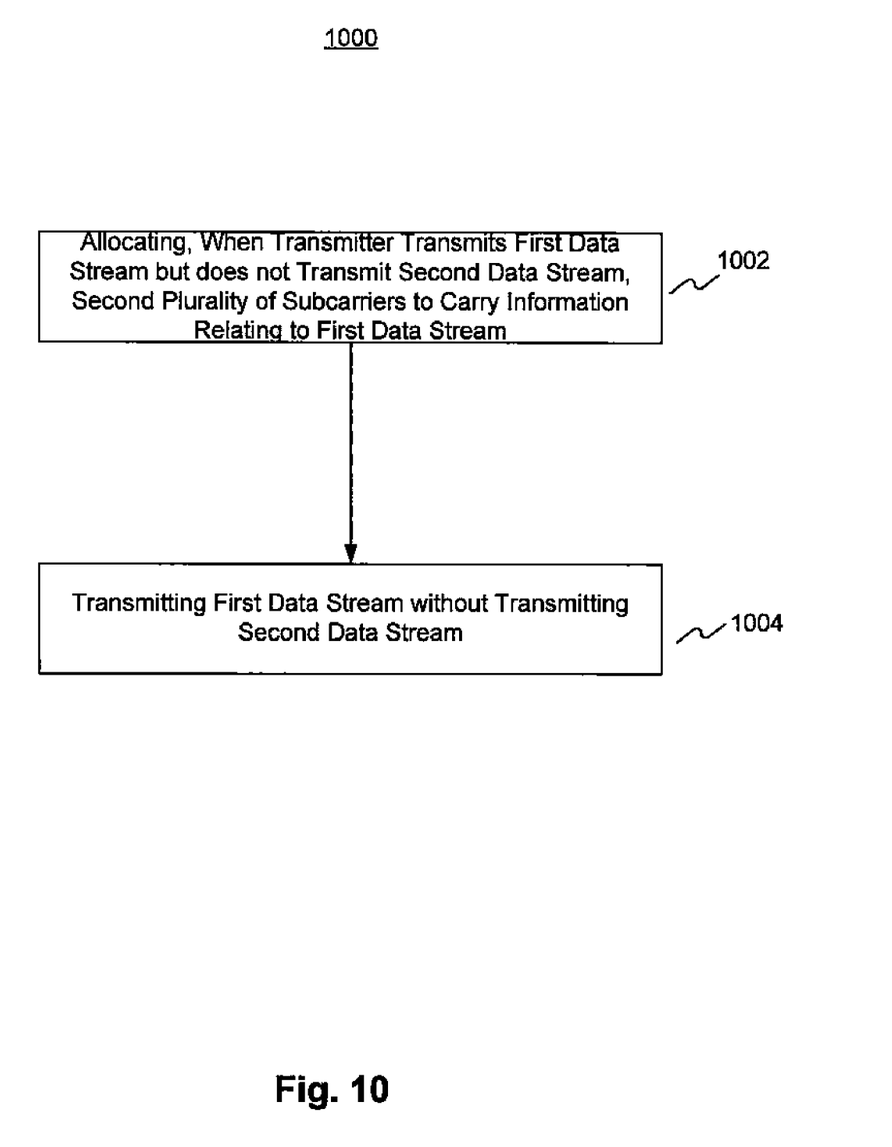
FIG. 10 is a flow chart showing a subcarrier allocation method for use by the transmitter, according to an exemplary embodiment.

FIG. 10 is a flow chart showing a subcarrier allocation method 1000 for use by the transmitter 900 (FIG. 9), according to an exemplary embodiment. For example, the transmitter 900 is configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream. Referring to FIG. 10, the method 1000 comprises: allocating, when the transmitter 900 transmits the first data stream but does not transmit the second data stream, the second plurality of subcarriers to carry information relating to the first data stream (1002), and transmitting the first data stream without transmitting the second data stream (1004).

Figure 11:
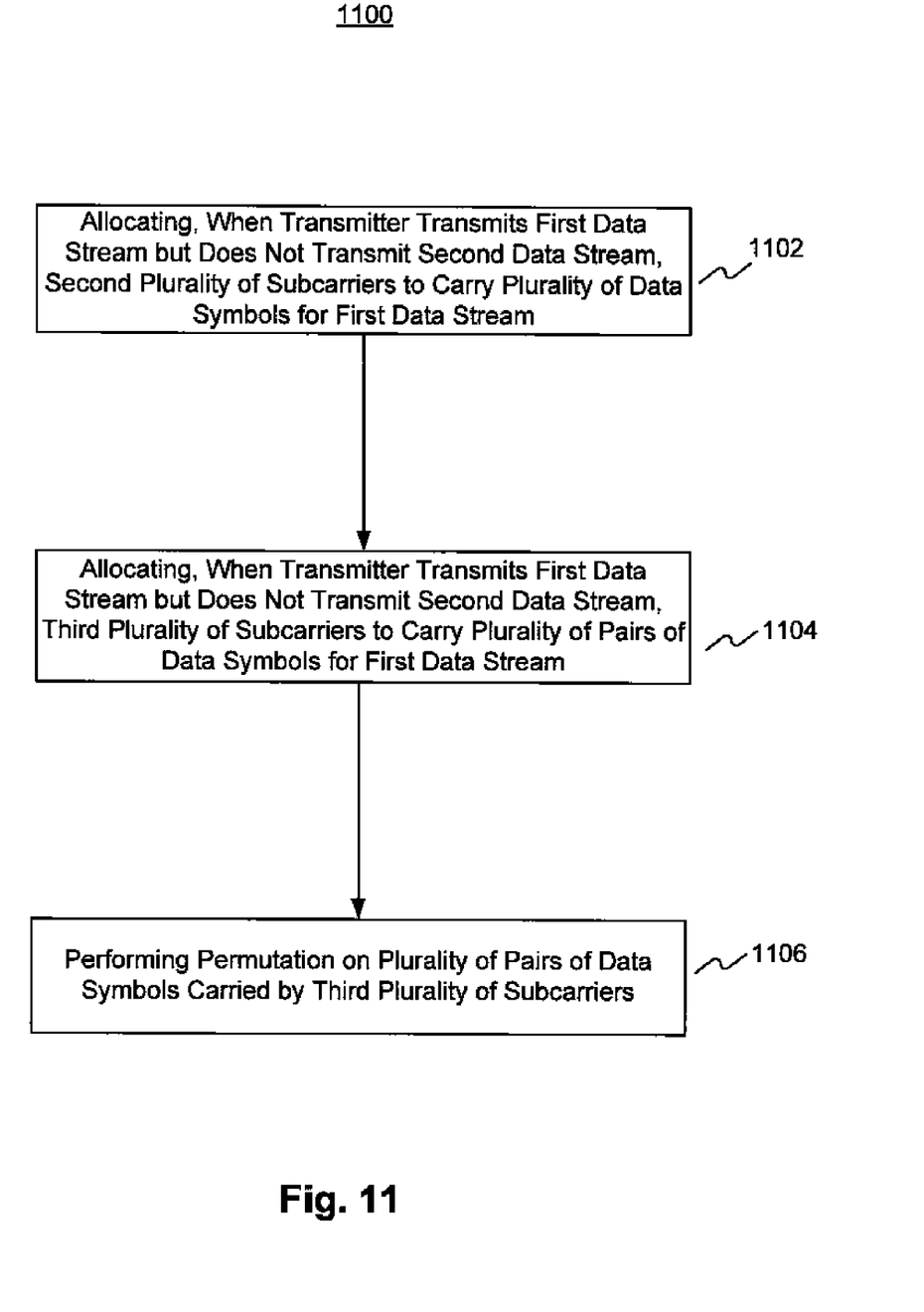
FIG. 11 is a flow chart showing a subcarrier permutation method for use by the transmitter, according to an exemplary embodiment.

FIG. 11 is a flow chart showing a subcarrier permutation method 1100 for use by the transmitter 900 (FIG. 9), according to an exemplary embodiment. For example, the transmitter 900 is configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream, and allocate data symbols for the first and second data streams to a third plurality of subcarriers. The method 1100 comprises: allocating, when the transmitter 900 transmits the first data stream but does not transmit the second data stream, the second plurality of subcarriers to carry a plurality of data symbols for the first data stream (1102); allocating, when the transmitter 900 transmits the first data stream but does not transmit the second data stream, the third plurality of subcarriers to carry a plurality of pairs of data symbols for the first data stream (1104); and performing permutation on the plurality of pairs of data symbols carried by the third plurality of subcarriers (1106).

While embodiments have been described based on two data streams, the disclosure is not so limited. It may be practiced with equal effectiveness with a greater number of data streams.

Other embodiments of the disclosure will be apparent to those skilled in the art from consideration of the specification and practice of the disclosure disclosed here. The scope of the disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A subcarrier allocation method for use by a transmitter, the transmitter being configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream, the method comprising:
   allocating, when the transmitter transmits the first data stream but does not transmit the second data stream, the second plurality of subcarriers to carry information relating to the first data stream.

2. The method of claim 1, wherein the allocating comprises:
   allocating the second plurality of subcarriers to carry control signals for the first data stream.

3. The method of claim 1, wherein the allocating comprises:
   allocating the second plurality of subcarriers to carry data symbols for the first data stream.

4. The method of claim 1, wherein the allocating comprises:
   allocating the second plurality of subcarriers to carry pilot symbols for the first data stream.

5. The method of claim 1, wherein the allocating comprises:
   allocating the first plurality of subcarriers to carry pilot symbols for the first data stream; and
   allocating the second plurality of subcarriers to carry pilot symbols for the first data stream, to thereby form a plurality of pairs of anti-polar pilot symbols.

6. A subcarrier permutation method for use by a transmitter, the transmitter being configured to, when transmitting first and second data streams, allocate pilot symbols for the first and second data streams to subcarriers, such that a first plurality of subcarriers carry the pilot symbols for the first data stream and a second plurality of subcarriers carry the pilot symbols for the second data stream, and allocate data symbols for the first and second data streams to a third plurality of subcarriers, the method comprising:
   allocating, when the transmitter transmits the first data stream but does not transmit the second data stream, the second plurality of subcarriers to carry a plurality of data symbols for the first data stream;
   allocating, when the transmitter transmits the first data stream but does not transmit the second data stream, the third plurality of subcarriers to carry a plurality of pairs of data symbols for the first data stream; and
   performing permutation on the plurality of pairs of data symbols carried by the third plurality of subcarriers.

7. The method of claim 6, further comprising performing no permutation on the plurality of data symbols carried by the second plurality of subcarriers.

8. The method of claim 6, further comprising performing permutation on the plurality of data symbols carried by the second plurality of subcarriers.

9. The method of claim 8, wherein the permutation on the plurality of data symbols carried by the second plurality of subcarriers is performed on a single data symbol basis, such that a first one of the plurality of data symbols carried by a first one of the second plurality of subcarriers is, after the permutation, carried by a second one of the second plurality of subcarriers.

10. The method of claim 8, wherein the permutation on the plurality of data symbols carried by the second plurality of subcarriers is performed on a single data symbol basis, such that a first one of the plurality of data symbols carried by a first one of the second plurality of subcarriers is, after the permutation, carried by a first one of the third plurality of subcarriers.

11. The method of claim 8, wherein the permutation on the plurality of data symbols carried by the second plurality of subcarriers is performed among different resource units.

12. The method of claim 8, wherein the permutation on the plurality of data symbols carried by the second plurality of subcarriers is performed within each resource unit.

13. The method of claim 8, wherein the transmitter is for use in an orthogonal frequency-division multiplexing (OFDM) based communication system, the permutation on the plurality of data symbols carried by the second plurality of subcarriers being performed within each OFDM symbol.

14. The method of claim 8, wherein the transmitter is for use in an orthogonal frequency-division multiplexing (OFDM) based communication system, the permutation on the plurality of data symbols carried by the second plurality of subcarriers being performed among different OFDM symbols.

15. The method of claim 6, wherein the permutation on the plurality of pairs of data symbols carried by the third plurality of subcarriers is performed on a data symbol pair basis, such that a first one of the plurality of pairs carried by first and second ones of the third plurality of subcarriers are, after the permutation, carried by third and fourth ones of the third plurality of subcarriers.

16. The method of claim 6, wherein the permutation on the plurality of pairs of data symbols carried by the third plurality of subcarriers is performed on a data symbol pair basis, such that a first one of the plurality of pairs carried by first and second ones of the third plurality of subcarriers are, after the permutation, carried by one of the second plurality of subcarriers and one of the third plurality of subcarriers.

17. The method of claim 6, wherein the permutation on the plurality of pairs of data symbols carried by the third plurality of subcarriers is performed among different resource units.

18. The method of claim 6, wherein the permutation on the plurality of pairs of data symbols carried by the third plurality of subcarriers is performed with each resource unit.

19. The method of claim 6, wherein the transmitter is for use in an orthogonal frequency-division multiplexing (OFDM) based communication system, the permutation on the plurality of pairs of data symbols carried by the third plurality of subcarriers being performed within each OFDM symbol.

20. The method of claim 6, wherein the transmitter is for use in an orthogonal frequency-division multiplexing (OFDM) based communication system, the permutation on the plurality of pairs of data symbols carried by the third plurality of subcarriers being performed among different OFDM symbols.

* * * * *